United States Patent Office
2,754,311
Patented July 10, 1956

2,754,311

AMINOMETHYL SILOXANE COMPOSITIONS AND THEIR PREPARATION

John R. Elliott, Schenectady, N. Y., assignor to General Electric Company, a corporation of New York No Drawing. Original application August 16, 1951, Serial No. 242,186. Divided and this application August 31, 1953, Serial No. 377,729

6 Claims. (Cl. 260—448.2)

This application is a division of my application Serial No. 242,186, filed August 16, 1951, now abandoned, and assigned to the same assignee as the present application.

This invention is concerned with a process for making organosilicon compositions containing nitrogen attached to silicon through aliphatic carbon. More particularly, the invention relates to a process for making an organosilicon composition containing nitrogen attached to silicon through aliphatic carbon, which process comprises effecting reaction between (1) a compound having the formula $HNXX_1$, where X and $X_1$ are members selected from the class consisting of hydrogen, monovalent hydrocarbon radicals, aminoalkyl radicals, aminoaryl radicals, silyl alkylene radicals, and further members whereby X and $X_1$ taken together with the nitrogen form a cycloaliphatic nitrogen-containing radical, and (2) an organosilicon compound containing chlorine attached to silicone through aliphatic carbon. The invention also includes compositions prepared in accordance with the process described above.

Organosilicon compounds containing nitrogen attached directly to the silicon atom are known in the art. However, organosilicon compounds containing nitrogen attached to silicon through aliphatic carbon are only slightly known in the art because of the difficulty with which such types of organosilicon compounds are prepared. In organic chemistry there are several ways in which amino groups (for example, —$NXX_1$ groups where X and $X_1$ have the meanings given above) may be attached to carbon by carbon-nitrogen bonds. One method comprises reacting an aliphatic compound containing aliphatic carbon-bonded chlorine with ammonia or an amino compound containing nitrogen-bonded hydrogen using either alcoholic solutions of the ammonia or amino compound or aqueous solutions of such materials. The reaction with the carbon-bonded chlorine goes relatively easy and in fairly good yield. Another method comprises reacting the carbon-bonded chlorine with sodium amide dissolved in liquid ammonia. Again, this reaction goes in fairly good yields and quite satisfactorily.

However, when one attempts to use the foregoing methods to attach nitrogen to aliphatic carbon which, in turn, is attached to silicon, innumerable difficulties are encountered with the net result that one finds that the methods described above are of little avail in preparing organosilicon compounds containing nitrogen attached to silicon through aliphatic carbon. Thus, when one attempts to react an ethyl alcohol solution saturated with gaseous ammonia with chloromethylpentamethyldisiloxane for times as long as one month, it will be found that little, if any, of the aminomethylpentamethyldisiloxane is obtained. Instead one finds that the chloromethyl group is cleaved in the alcoholic ammonia to yield dimethylsiloxy structures which react with other methylsiloxy groups in the reaction mixture to give some hexamethyldisiloxane and other normal chain-stopped linear methyl silicone structures, as, for example, octamethyltrisiloxane. No detectable amount of aminomethylpentamethyldisiloxane was noted. Aqueous ammonia used in place of alcoholic ammonia will give generally the same results.

While previous workers have prepared a limited number of organosilicon compounds containing nitrogen attached to silicon through aliphatic carbon, the procedures for making such compositions are quite complex and of little utility from a commercial viewpoint. One such method involves use of the complicated Hoffman degradation process which holds little commercial interest because of its complexity, and because compounds containing the

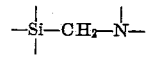

grouping connot be prepared by this method.

I have now discovered unexpectedly a simple method for making organosilicon compositions which have nitrogen attached to silicon through the medium of aliphatic carbon. More particularly, in accordance with my discovery, I have found that if one employs organosilicon compositions containing a chlorine atom attached to the silicon through the medium of aliphatic carbon, one can effect replacement of the chlorine atom with a nitrogen atom by reacting the aforesaid chlorinated derivative directly with a compound corresponding to the general formula, —$HNXX_1$, where X and $X_1$ have the meanings given above.

My invention is believed to be unique in making organosilicon compositions containing nitrogen bonded to silicon by aliphatic carbon in that it makes use of the only known neutral or acid aminating media and also is characterized by the fact that only a neutral or acid medium in the sense described below is operative. In addition it makes possible the preparation of aminomethyl silicon compositions which cannot be prepared by any prior known process.

In the above formula $HNXX_1$, X and $X_1$, in addition to being hydrogen may be, for example, an aminoalkyl radical, for instance, aminomethyl, aminoethyl, aminopropyl, aminobutyl, etc.; an aminoaryl radical, e. g., aminophenyl, aminobiphenyl, etc.; an alkyl radical, for instance, methyl, ethyl, propyl, isopropyl, butyl, hexyl, octyl, isooctyl, etc.; aryl radical, for instance, phenyl, naphthyl, biphenyl, anthracyl, etc.; alkaryl radical, for instance, tolyl, xylyl, ethylphenyl, etc.; aralkyl radical, for instance, benzyl, phenylethyl, etc.; cycloaliphatic, for instance, cyclopentane, cyclohexane, etc. Examples of cycloaliphatic nitrogen radicals in which X and $X_1$ are both attached to the same nitrogen, are, for instance, piperidine, morpholine, pyrrolidine, methyl piperidine, piperazine, etc. It is also apparent that compounds such as diethyl amine, dibutyl amine, hexamethylene diamine, ethylene diamine, etc., are included in the above general formula. It is preferred, if possible, that the compound having the formula $HNXX_1$ (which hereinafter will be referred to as the "amino compound") be a liquid under the conditions of the reaction, and that the reaction medium be neutral or acidic in the sense hereinafter described. However, solid amino compounds or liquid amino compounds dissolved in neutral inert solvents for the amino compounds and the chlorintaed organosilicon compounds are not precluded and may advantageously be employed. Such inert solvents are, e. g., benzene, toluene, xylene, saturated liquid aliphattic compounds, etc. Preferably both X and $X_1$ are the same and are hydrogen atoms.

The types of organosilicon compounds containing chlorine attached to silicon through aliphatic carbon which may be employed in the practice of the present invention are numerous, and for purposes of brevity such an organosilicon compound will hereinafter be referred to as the "chlorinated organosilicon compound." The chlorinated organosilicon compound is intended preferably to include those in which the aliphatic group containing chlorine may contain one or more carbon-bonded chlorines but no more than one chlorine atom being on any one carbon atom. One type of chlorinated organosilicon compound which may be employed comprises chlorinated derivatives of organosilicon compounds corresponding to the general formula—

I 

where carbon-bonded hydrogen is replaced with carbon-bonded chlorine. In the above formula, R, $R_1$, $R_2$, and $R_3$ may be hydrogen and monovalent hydrocarbon radicals similar to those described for X and $X_1$, above, and $R_1$, $R_2$ and $R_3$, in addition may also be an hydroxy group, or a hydrolyzable group, for example, a halogen, for instance, chlorine, bromine, etc., an alkoxy radical, for instance, methoxy, ethoxy, tertiary butoxy, etc., amino group, the —NCO or —NCS group, etc.

A particular group of aminated organosilicon compounds which may be prepared are, for instance, those coming within the general formula II 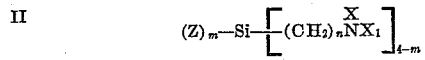

where Z is a monovalent hydrocarbon radical similar to those defined for R, $R_1$, $R_2$, and $R_3$ above; X and $X_1$ have the meanings given above and in addition may also be a silylalkylene group, e. g., the grouping represented by the structure

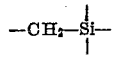

etc.; $n$ is an integer equal to at least 1, for instance, from 1 to 5, inclusive or more, and $m$ is an integer equal to from 1 to 3, inclusive. These compounds may be prepared by the type of reaction exemplified below.

III 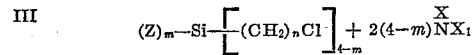

One specific class of compounds are those corresponding to Formula II where $n=1$ only. The unusual stability of these aminoethyl silanes toward alkaline cleavage is unexpected in the light of the known instabilities of aliphatic silanes bearing functional groups such as chlorine on the aliphatic groups.

The chlorinated organosilicon compounds derived from such compositions as defined for the silane, of Formula I, may contain the chlorine on any one of the carbon atoms attached directly to the silicon atom or attached to the silicon atom through a chain of two or more carbon atoms. Among such compositions may be mentioned compounds having the following formulas from which may be derived directly or indirectly the following amino derivatives in which X and $X_1$ have the meanings given above:

($CH_3$)$_3$SiCH$_2$Cl to give ($CH_3$)$_3$SiCH$_2$NXX$_1$
($C_2H_5$)$_2$Si(CH$_2$Cl)$_2$ to give ($C_2H_2$)$_2$Si(CH$_2$NXX$_1$)$_2$
(CH$_2$Cl)SiHCl$_2$ to give, e. g., (CH$_2$NXX$_1$)SiHCl$_2$, (CH$_2$NXX$_1$)SiH(NXX$_1$)$_2$, etc.
(CH$_2$Cl)$_4$Si to give, e. g., (CH$_2$NXX$_1$)$_4$Si, (CH$_2$NXX$_1$)-Si(CH$_2$Cl)$_2$, etc.
($CH_3$)$_3$Si(CHClCH$_2$Cl) to give, e. g.,
  ($CH_3$)$_3$Si(CHNXX$_1$CH$_2$NXX$_1$),
  ($CH_3$)$_3$Si(CHClCH$_2$NXX$_1$), etc.
($CH_3$)$_2$(CH$_2$Cl)SiCl to give, e. g.,
  ($CH_3$)$_2$(CH$_2$NXX$_1$)SiCl,
  ($CH_3$)$_2$(CH$_2$NXX$_1$)SiNXX$_1$, etc.
(CH$_2$Cl)$_2$Si(C$_6$H$_5$)$_2$ to give (CH$_2$NXX$_1$)$_2$Si(C$_6$H$_5$)$_2$
(CH$_2$Cl)Si(CH$_3$)$_2$C$_6$H$_5$ to give
  (CH$_2$NXX$_1$)Si(CH$_3$)$_2$C$_6$H$_5$ In the foregoing chlorinated organosilicon compounds directed specifically to monosilicon derivatives, it will be apparent to those skilled in the art that the chlorine atom may be present on any one of the carbon atoms attached directly to the silicon atom or attached to silicon indirectly through other aliphatic carbon. In addition, each carbon atom may have a chlorine atom attached thereto with which the amino compound may be caused to react. Other chlorinated organosilicon compounds are contemplated in which chlorination on aliphatic carbon is made of compounds such as those disclosed in Formula I.

It will also be apparent from the above examples that when one employs chlorinated organosilicon compositions containing a silicon atom to which is directly attached an alkoxy radical, for instance, compounds such as (CH$_2$Cl)$_2$Si(OC$_2$H$_5$)$_2$, CH$_2$ClSi(OCH$_3$)$_3$, C$_2$H$_5$—O—Si(CH$_2$Cl)(CH$_3$)—O—Si(CH$_3$)$_2$OC$_2$H$_5$, etc., the amino compound as exemplified by NH$_3$ may react with the chlorine atom and the silicon-bonded alkoxy radical to give compounds with and without substitution of —NXX$_1$ groups directly on the silicon, for example, (CH$_2$NH$_2$)$_2$Si(NH$_2$)$_2$, CH$_2$NH$_2$Si(NH$_2$)$_3$, (CH$_2$NH$_2$)$_2$Si(OC$_2$H$_5$)$_2$, CH$_2$NH$_2$Si(OCH$_3$)$_3$, etc.

Just as I have disclosed above various chlorinated organosilicon compositions containing a single silicon atom, I also intend to include chlorinated organosilicon compounds which can be reacted with the amino compound and which contain a plurality of two or more silicon atoms connected directly to each other (polysilylene compounds) and containing silicon-bonded monovalent hydrocarbon radicals and having chlorine attached directly to aliphatic carbon which, in turn, is attached to silicon either directly or indirectly through another carbon atom. Also the number of chlorine atoms which may be attached individually to the various carbon atoms of such polysilylene compositions, e. g., those disclosed in Burkhard Patent 2,554,976 and in Hunter Patent 2,554,193, may vary within wide limits and may afford a multitude of points of reaction with the amino compounds mentioned above.

In addition to monosilicon and polysilylene compositions containing chlorine attached to silicon through aliphatic carbon, which can be reacted with the amino compound, I may also employ organopolysiloxanes (either linear, branch-chained, cyclic, etc.) containing silicon-bonded aliphatic groups in which at least one chlorine is attached to an aliphatic group which, in turn, is attached to silicon by a carbon-silicon bond. Thus, various organopolysiloxanes, for instance, methyl polysiloxanes, methyl and phenyl polysiloxanes in which there are present from about 1.0 to 3.0, e. g., 1.3 to 2.5 methyl or total methyl and phenyl groups per silicon atom may be subjected to chlorination generally by merely passing the requisite amount of chlorine into the polymer to be treated. The chlorine becomes attached to the carbon atoms of one or more of the aliphatic radicals bonded to the silicon atoms by displacement of hydrogen therefrom. The use of ultraviolet light as a means for effecting chlorination of the groups attached to the silicon atom has been found helpful as shown in Nordlander Patent 2,439,669. The chlorinated organosilicon compound comprising organopolysiloxanes having silicon-bonded aliphatic groups may comprise cyclic organopolysiloxanes, for instance, the tetramer or pentamer of dimethylsiloxane and methyl phenylsiloxane having, respectively, the recurring structural units

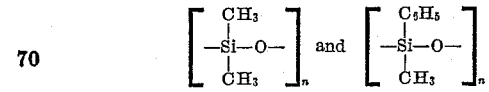

where $n$ is an integer, e. g., from 4 to 6 or more, whereby one or more of the hydrogens of the methyl groups may be replaced with chlorine. Some of these chlorinated cyclic derivatives are more particularly described in the after-mentioned McGregor et al. Patent 2,522,053 and include cyclic chlorinated dimethylsiloxane containing from 1 to 10 or more carbon-bonded chlorine atoms per cyclic unit. Where the aliphatic radicals attached to the silicon atoms by carbonsilicon linkages in the organopolysiloxanes are radicals other than the methyl radical, e. g., ethyl, propyl, butyl, etc., it will be apparent that the degree of substitution of the chlorine for the hydrogen or hydrogens on the aliphatic radical may vary and may occur throughout the aliphatic radical attached to such silicon atoms.

Among such chlorinated organopolysiloxanes which can be reacted with the amino compound may be mentioned, for example, chloromethyl pentamethyl disiloxane, bis-(chloromethyl) tetramethyl disiloxane, chloromethyl heptamethyl cyclotetrasiloxane, tri-(chloromethyl) pentamethyl trisiloxane, as well as many other organopolysiloxanes in which other silicon-bonded organic groups may be present in addition to the methyl groups, and in which the organic groups may be any one of the monovalent hydrocarbon radicals which X, $X_1$, R, $R_1$, $R_2$ and $R_3$ represent. In addition, silicon-bonded aliphatic groups other than methyl groups, e. g., ethyl, propyl, butyl, etc., radicals containing one or more carbon-bonded chlorine atoms are contemplated.

Longer chain chlorinated organopolysiloxanes of linear character may also be employed, as for instance the chlorinated linear chain-stopped polysiloxanes, many examples of such non-chlorinated compositions which can be subjected to chlorination and the chlorinated products subjected to reaction with the amino compound being more specifically disclosed in Patnode Patents 2,469,888 and 2,469,890. Thus, chlorination of such compounds may give, for example, chloromethyl heptamethyl trisiloxane, chloromethyl tetramethyl diphenyl trisiloxane, chloromethyl nonaphenyl tetrasiloxane, di-(chloromethyl) hexamethyl trisiloxane, chloromethyl tri-(trimethylsiloxy) silane, etc. As was the case described above, the number of chlorine substituents on the aliphatic groups, whatever they might be, may vary from one to any number depending on the number of chlorines which can properly be substituted on aliphatic groups attached to silicon atoms by carbon-silicon linkages. I do not intend to be limited to any particular number of chlorine atoms since one or more chlorine atoms substituted on one or more of the aliphatic groups are contemplated, although one chlorine substituent per carbon is the preferred upper limit of chlorine substitution. The above chlorinated organopolysiloxanes may be reacted with the amino compound to give organopolysiloxanes containing nitrogen attached to silicon through aliphatic carbon.

A specific class of polymeric compounds may be those containing the unit.

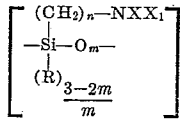

by itself or intercondensed with other siloxane units, where R is a monovalent hydrocarbon radial, n is an integer equal to at least 1, e. g., from 1 to 5 or more, X and $X_1$ have the meanings given above, and m is one of the following: 1, 1.5.

A still further class of compositions are those having the average general formula

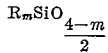

where R is a member selected from the class consisting of monovalent hydrocarbon radicals and —$(CH_2)_n NXX_1$ radicals, where X and $X_1$ have the meanings given above, m is an integer equal to from 1 to 3, inclusive, and n is an integer equal to at least 1, e. g., from 1 to 5 or more, there being present in the composition at least one R where R is the aforesaid —$(CH_2)_n NXX_1$ radical.

A still further class of chlorinated organosilicon compounds which may be employed in my claimed process for making many of the new compositions herein described are chlorinated organosilicon compositions having the recurring structural unit

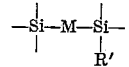

where M is a divalent hydrocarbon radical

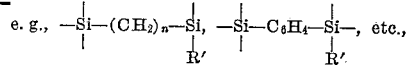

and R' is a chlorinated aliphatic radical, specifically, chloroalkyl, for instance, chloromethyl, chloroethyl, dichloroethyl, etc. These types of compositions from which the chlorinated derivatives may be prepared and which in turn can be reacted with the amino compound may be found disclosed, for instance, in Goodwin Patents 2,544,079, 2,527,807–809, 2,511,812, 2,507,512, 2,507,513, 2,507,518–520, and 2,483,972; Bluestein Patents 2,519,879 and 2,452,895; Sommer Patent 2,507,551; Speier Patent 2,444,858; Clark Patents 2,507,521, 2,507,514, 2,507,515–517, and 2,557,782; Krieble Patent 2,479,374; and Sauer Patent 2,491,833. Chlorination of these various compositions by methods well-known in the art and also disclosed in some of these patents will yield chlorinated organosilicon compositions containing chlorine attached to silicon by aliphatic carbon.

Various methods may be employed for preparing the different chlorinated organosilicon compounds containing one or more silicon atoms described above. In this connection attention is directed to patents such as Kohl Patent 2,530,202; Goodwin Patents 2,527,807, 2,527,809, 2,511,812, and 2,483,972; Fletcher et al. Patent 2,528,355; Gilliam Patent 2,474,578; Nordlander Patent 2,439,669; Sommer Patent 2,512,390; Elliott et al. Patents 2,513,924 and 2,457,539; Speier Patents 2,527,591, 2,510,148, and 2,510,149; and McGregor et al. Patents 2,507,316, 2,522,053, 2,384,384, and 2,435,148.

After reaction of the chlorinated organosilicon compound with the amino compound, it will be found that many of the compositions thereby obtained may contain a grouping which may be represented by the following—

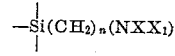

where X and $X_1$ have the meanings given above and in addition X and $X_1$ may also be a —Si—$(CH_2)_n$-grouping, and n is a whole number equal to at least 1, for instance, from 1 to 8, preferably from 1 to 4. It is also possible in cases where the chlorinated organosilicon compositions contain more than one silicon-bonded chloroaliphatic group, or the chloroaliphatic group of one chlorinated organosilicon compound is adjacent to the chloroaliphatic group of another chlorinated aliphatic silicon compound, that the amino compound especially where it contains two nitrogen-bonded hydrogens, may act as a cross-linking agent whereby the chlorines on the chlorinated aliphatic radicals may react with the amino compounds and split out HCl to form, in the case of ammonia, a

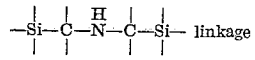 linkage or a

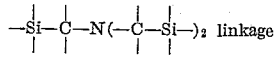 linkage where the residual valence bonds of the silicon may be taken up by a member selected from the class consisting of silicon, oxygen, carbon, hydrogen, nitrogen, etc., and the residual valences of the carbon may be satisfied by a member selected from the class consisting of hydrogen, silicon, carbon and nitrogen.

It is generally preferred and desirable that the reaction medium be substantially anhydrous, especially when using liquid ammonia, and that the amino compound be liquid at room temperature in order to permit easy reaction with the chlorinated organosilicon composition.

In addition, although I do not wish to be bound by speculative theoretical considerations, it is believed that a substantially neutral or acid medium is essential for the reaction between the amino compound and the chlorinated organosilicon composition, and that there is essentially complete absence of any alkaline medium. The term "neutral" and "acid" may be defined in the sense of the Franklin-Germann theory of acids and bases [see J. A. C. S. 27, 820 (1905) and J. A. C. S. 47, 2461 (1925)] which presents a limited phase of the Lewis (see Lewis' book "Valence and Structure of Atoms and Molecules" published by Chemical Catalog Company, New York city, 1923) generalized theory of acids and bases. I prefer to use the Franklin and Germann theory of acids and bases because it is more germane to the concept of this invention since it explains more adequately the neutral and acid media referred to above. Thus, a system comprising for instance ammonium chloride dissolved in anhydrous liquid ammonia is considered an acid system and such acidic systems are intended to be included. The work of Franklin and Germann defined an acid as a solute that gives rise to a cation characteristic of the solvent. This may be characterized by the following equations which show the ionization of ammonia as compared to the ionization of water

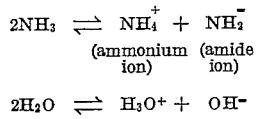

Thus, anhydrous liquid ammonia is a neutral substance as is water and an anhydrous solution of ammonium chloride in liquid ammonia is an acid because the solute has increased the concentration of the ammonium cation. Over and above this theory, the acidic characteristics of the latter system are emphasized by the fact that this ammonium chloride-ammonia solution (a) neutralizes bases, (b) gives the acid color change with acid-base indicators, (c) replaces weaker acids from their compounds, (d) catalyzes many reactions which are known to be acid-catalyzed, and (e) reacts with metals with the liberation of hydrogen. Solutions of hydrochloride salts of the other amino compounds described above (having the formula $HNXX_1$) in the amino compound per se adhere to the same theoretical considerations and possess similar acidic characteristics.

Reaction between the amino compound and the chlorinated organosilicon composition may be conducted within a wide range of atmospheric and superatmospheric pressures. Superatmospheric pressures (either by autogenous pressures or pressures induced in other manners) are preferred for faster and more complete reaction.

The temperatures employed during the reaction may be varied widely. Generally, temperatures ranging from about −35° to 150° C. or more, are advantageously employed. Reaction appears, however, to go satisfactorily in many instances at room temperature.

After the reaction has been concluded, the excess amino compound is removed, the residue treated with alkali, and the resultant product resolved into its components, for instance, by fractional distillation, to give the desired organosilicon composition containing nitrogen attached to silicon through aliphatic carbon.

The amount of amino compound employed for reaction with the chlorinated organosilicon compounds should be sufficient to react with all the reactive groups in the chlorinated organosilicon compound other than the chlorine attached to silicon by aliphatic carbon, and still have an excess of the amino compound sufficient to react with the chlorine atom or atoms attached to silicon through aliphatic carbon. Since it is usually desirable that the reaction between the amino compound and the chlorinated organosilicon compound be conducted using an excess of the amino compound as the reaction medium, it is also, therefore, apparent that an additional amount of amino compound should be employed initially to act as a medium for the reaction. However, this excess of amino compound may sometimes be reduced by the use of an inert diluent retaining sufficient amino compound for replacement of the chlorine atoms with the —$NXX_1$ grouping and still having sufficient to act as a hydrohalide acceptor described below. Finally, since hydrogen chloride will be liberated during the reaction, it has been found advantageous to employ an additional amount of amino compound in order to act as a hydrogen chloride acceptor. Because of the foregoing factors, it is apparent that it is difficult to recite any actual molar concentrations of the amino compound which should be used during the reaction due to the variety of conditions and compositions employed. If desired, inert hydrohalide acceptors such as tributyl amine, pyridine quinoline, etc., may be substituted in place of some of the excess amino compound intended as a hydrohalide acceptor.

The following examples give adequate basis for determining molar concentrations. To aid in further understanding the concentrations which are advantageously employed, considering specifically the reaction of ammonia and, for instance, chloromethylpentamethyldisiloxane, it will be apparent that two mols of ammonia are necessary for reaction with the carbon-bonded chlorine and also to act as a hydrogen chloride acceptor for the liberated hydrogen chloride. Since there are no other groups of the chloromethylpentamethyldisiloxane which are reactive with the ammonia, additional amounts of ammonia need not be provided. However, if there were other reactive groups on the disiloxane as, for example, another carbon-bonded chlorine, or there was present a silicon-bonded chlorine, additional provision for these reactive groups might be required by employing additional molar quantities of ammonia. Since the reaction between the ammonia and the above-described disiloxane is to be conducted in the ammonia as the solvent medium, it has been found advisable to use from about 1 to 100 or more additional mols of ammonia over and above that required for effecting the results above.

Due consideration, of course, must be given to the type of amino compound employed, that is, whether ammonia, per se, is used or a primary amino compound or a secondary amino compound is used. In addition, the facility with which the reaction is carried out and the various economics involved in such a reaction using ammonia or the amino compound, which includes the ease with which separation of the components may be effected after reaction is conducted, are further considerations which will determine how large an excess of the amino compound should be employed during the reaction. It is to be understood that the molar concentrations outlined above are solely for guiding persons skilled in the art, and the applicant is not to be considered as being restricted to any of the proportions recited above. Obviously, larger or smaller (where inert solvents are employed) amounts of the amino compound may be used without departing from the scope of the invention. It is believed, however, that persons skilled in the art will readily understand, given a certain set of reactants, the best molar concentrations of amino compound and chlorinated organosilicon compound to be used. It has been found that when using liquid ammonia as the amino compound, in order to obtain increased yields of the primary amine derivative, larger molar proportions of the ammonia should be employed. Decreasing the molar proportions of ammonia tends to give greater yields of the secondary and tertiary amino derivatives.

In order that those skilled in the art may better understand how the present invention may be practiced, the following examples are given by way of illustration and not by way of limitation.

Example 1

About 196.5 grams of chloromethyl pentamethyl disiloxane (prepared in accordance with the disclosure of Elliott et al. Patent 2,513,924) and 350 grams liquid ammonia were charged to a rocking autoclave (anhydrous medium) and agitated for 4½ days at room temperature. The excess ammonia was discharged and the autoclave opened. By this method a liquid and a solid portion were obtained. The solid was dissolved in water, made basic with NaOH and extracted with benzene. The liquid portion which weighed about 158 grams was washed with dilute NaOH, filtered, and charged with the benzene washings to a fractionating column. Fractional distillation of this material yielded 49.5 grams of aminomethyl pentamethyl disiloxane boiling at 145–148° C., having a refractive index $n_D^{20}$ 1.4089, a density $d_4^{20}=0.8374$, and 63 grams of bis-(pentamethyl disiloxanylmethyl) amine having the formula

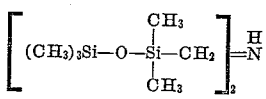

which boiled at 143–148° C. /52 mm., had a refractive index $n_D^{20}$ 1.4158, and a density $d_4^{20}=0.8496$.

Example 2

In this example 49.4 grams of chloromethylpentamethyl disiloxane, 270 grams liquid ammonia and 200 mg. of NH4Cl were charged to a rocking autoclave and agitated for 7 days at room temperature. At the end of this time the excess ammonia was discharged and the autoclave opened. The residue consisted of a solid and a liquid phase. The solid phase was washed with ether and after drying amounted to about 13.3 grams. This solid was identified as ammonium chloride by its solubility in water, formation of a white precipitate when acidified with HNO3 and treated with AgNO3, and gave a copious evolution of NH3 when a solution was rendered basic with sodium hydroxide. The theoretical yield of ammonium chloride for the reaction is 13.5 grams. The liquid portion which weighed about 30 grams was fractionally distilled to give 19.2 cc. of distillate boiling between 148.5 and 148.8° C. This material had a refractive index of $n_D^{20}$ 1.4090 and a nitrogen content of 7.84 per cent. The theoretical nitrogen content of aminomethyl pentamethyl disiloxane is 7.90%. The above formed aminomethyl pentamethyl disiloxane was heated with 20% aqueous KOH, solid KOH, and KOH plus butanol. No analyzable amount of methyl amine was obtained. This treatment showed clearly the extreme stability of the aminomethyl group towards alkaline cleavage. It is such stability under highly basic or alkaline conditions that makes the aminated derivatives herein described so desirable. Such stability could in no way have been predicted since it was known that the chloromethyl group on silicon was unstable to alkaline conditions. In addition, silicon-bonded nitrogen is also subject to easy hydrolysis and fission under even the mildest conditions.

Example 3

Cyclic or linear organosilicon compositions containing nitrogen attached to silicon through aliphatic carbon may be prepared by methods similar to those described above. Thus, for instance, monochloromethyl heptamethyl cyclotetrasiloxane may be reacted with liquid ammonia (or any amino compound of the type described above) to give aminomethyl heptamethyl cyclotetrasiloxane (or other aminated derivatives of the cyclotetrasiloxane). By the same means, for example, di-(chloromethyl) hexamethyl trisiloxane may be reacted with liquid ammonia or any amino compound described above to give, for instance, di-(aminomethyl) hexamethyl trisiloxane.

Example 4

Organosilicon compositions containing a single silicon atom to which is attached aliphatic carbon containing carbon-bonded chlorine, many examples of which have been described above, may also be caused to react with the amino compound, for example, liquid ammonia, to give the aminated derivatives herein described.

Thus chloromethyltrimethylsilane may be reacted with an amino compound, for example, anhydrous liquid ammonia in an excess of the latter as the reaction medium at around room temperature, preferably under pressure, to form an amino derivative thereof which in the case of liquid ammonia would be aminomethyltrimethylsilane. The following examples are illustrative of further reactions between amino compounds and chlorinated organosilicon compositions.

Example 5

A solution of 25 grams (0.20 mol) chloromethyltrimethylsilane and 90 grams (1.2 mols) of n-butylamine was refluxed 27 hours in a reaction flask equipped with a reflux condenser. The addition of 120 ml. of 10% aqueous KOH to the resulting solution to neutralize any hydrochlorides gave a single phase system which was distilled. After most of the n-butylamine had been removed, a two-phase distillate was obtained at around 95°–102° C. The upper layer was dried over anhydrous sodium sulfate and distilled through a Vigreux column. There was thus obtained 6.5 grams of a liquid boiling at 164–166° C. at atmospheric pressure, $n_D^{20}$ 1.4250, and having a neutral equivalent of 163 (theoretical, 159). This material represented approximately a 20 per cent yield of n-butylaminomethyltrimethylsilane.

Example 6

Diethylaminomethyltrimethylsilane having the formula $(CH_3)_3SiCH_2N(C_2H_5)_2$ was prepared by refluxing a solution of 25 grams (0.20 mol) chloromethyltrimethylsilane and 88 grams (1.2 mols) diethylamine for 40 hours to give a white precipitate. After excess diethylamine had been distilled from the reaction mixture, a residue consisting of both a liquid and a solid was obtained. Thereafter, 120 ml. aqueous KOH was added to the residue to give a two-phase system, the upper layer of which was distilled to give a liquid boiling above 120° C. This liquid was dissolved in dilute hydrochloric acid, non-basic contaminants were removed, and the base was recovered from hydrochloric acid solution by neutralization with KOH. Drying and distillation of the basic material gave a liquid, silicon-containing product boiling at 145–150° C., having a refractive index $n_D^{20}$ 1.4231, and a neutral equivalent of 163 (theoretical, 159). This material represented the desired compound diethylaminomethyltrimethylsilane.

Example 7

Diethylaminomethylheptamethylcyclotetrasiloxane having the formula $[(CH_3)_2SiO]_3[(C_2H_5)_2NCH_2Si(CH_3)O]$ was prepared by refluxing 75 grams (0.22 mol) chloromethylheptamethylcyclotetrasiloxane, 32 grams (0.44 mol) diethylamine, and 100 ml. toluene. The solution was refluxed for 11 hours with periodic filtration of the precipitated salts to determine the extent of the reaction. Finally, excess diethylamine, 17 grams (0.23 mol), was added and the refluxing was continued for 7 more hours to insure complete reaction. A total of 23 grams of precipitate was obtained; the theoretical weight for diethylamine hydrochloride is 26.5 grams. The toluene solution of the product was washed thoroughly with water to remove all traces of hydrochloride. Distillation gave 32 ml. of a basic silicon-containing material boiling at 110–118° C. at 5 mm. Redistillation of this latter material through a Vigreux column gave a liquid boiling at 60–62° C. at 1 mm., having a refractive index of $n_D^{20}$ 1.4240, and a neutral equivalent of 374 (theoretical, 369). This material represented essentially pure diethylaminomethylheptamethylcyclotetrasiloxane.

*Example 8*

A solution of 75 grams (0.23 mol) chloromethylheptamethylcyclotetrasiloxane in 100 grams (1.4 mols) n-butylamine was refluxed for 3 hours whereupon a two-phase liquid system was obtained. The silicon-containing lower layer was freed of n-butylamine by distillation and the liquid residue which remained formed a two-layer system. The lower liquid layer was separated and found to contain silicon and was free of halogen. Heating for a short time at 150° C. converted the liquid to a soft, solid polymer comprising dimethylsiloxy and n-butylaminomethylmethylsiloxy structural units. Thermal depolymerization at about 500° C. gave a basic liquid distillate having a neutral equivalent of 482. The theoretical neutral equivalents for compositions having an average of 4, 5 and 6 dimethylsiloxy groups per n-butylaminomethylmethylsiloxy group are 445, 519 and 593, respectively. Distillation of the cracked product gave a range of basic and non-basic products among which was a small amount of a basic material boiling at around 130–150° C. at 10 mm., having a neutral equivalent of 540 and which was believed to be the cyclic derivative having 5 dimethylsiloxy groups and 1 n-butylaminomethylmethylsiloxy group, whose structure was believed to be

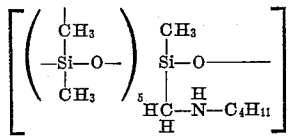

*Example 9*

A solution of 50 g. (0.41 mol) chloromethyltrimethylsilane and 204 g. (2.24 mols) aniline was refluxed for 8 hours at 153° C. After the reflux period the precipitated solids were filtered from the reaction mixture, and the filtrate was washed several times with water. About 50 ml. of toluene was added to the mixture to expedite the separation of layers during the washing operation. After low boiling compounds had been stripped, the reaction product was redistilled to give a liquid boiling at 60–70° C. at less than 1 mm., $n_D^{20}$ 1.5245. This composition gave a positive test for silicon and was identified as N-phenylaminomethyltrimethylsilane as evidenced by the fact that analysis of the compound showed it to contain 8.3% nitrogen (theoretical 7.8% nitrogen). The slightly high nitrogen content of the material may be attributed to the presence of small traces of residual aniline.

*Example 10*

This example illustrates the preparation of the compound the same N-phenylaminomethyltrimethylsilane using less aniline than in the previous example and using a solvent for the reaction mixture. More particularly, a solution of 50 g. (0.41 mol) chloromethyltrimethylsilane and 67 g. (0.72 mol) aniline diluted with 100 ml. of toluene was refluxed for 85 hours at 105° C. A white precipitate of aniline hydrochloride formed during the reaction and was filtered from the mixture. After being washed several times with water, the filtrate gave a negative Beilstein test for halogen. The lower boiling components were stripped from the reaction mixture, and several distillations of the residual brown liquid gave a liquid fraction boiling at 65–75° C., $n_D^{20}$ 1.5247–9. This material which gave a positive test for silicon was identified as the compound as that obtained in Example 9, namely N-phenylaminomethyltrimethylsilane.

*Example 11*

A solution of 35 grams (0.41 mol) piperidine, 25 grams (0.21 mol) chloromethyltrimethylsilane, and 100 ml. of isooctane was refluxed for 10 hours. A white solid which formed during the reaction was removed by filtration, and the filtrate was freed of volatile components by distillation. Further distillation gave 11 grams of a colorless liquid boiling at 52–4° C. at 2 mm., $n_D^{20}$ 1.4512, neutral equivalent 172 (theory 171). This represented a 28% yield of piperidinomethyltrimethylsilane.

*Example 12*

Using the same conditions as described in Example 4, chloromethyl methyldichlorosilane may be reacted with liquid ammonia to form such compounds as, for example, aminomethyl methyldiaminosilane, and polymeric silazanes containing silicon-bonded aminomethyl groups and silicon atoms attached to each other through a —NH— grouping.

As pointed out previously, the reaction is conducted in the absence of any alkaline medium. Although, for example, ammonium chloride may be employed with liquid ammonia to give a Lewis-stype or Franklin-Germann type acidic medium in the sense more particularly described above, preformed ammonium chloride may not be necessary since the reaction of the ammonia or amino compound with the carbon-bonded chlorine will, in itself, produce sufficient ammonium chloride or the hydrochloride of the amino compound to cause the medium to be acidic in this sense.

The compositions herein described have various uses. Because of the eminent stability of the nitrogen on the carbon, they may be used as intermediates in the preparation of other compositions, for example, ion exchange resins, which would contain silicon therein and might be extremely useful in highly alkaline environments where the stability of the nitrogen under such conditions can be utilized.

In addition, the organosilicon compositions containing nitrogen attached to silicon through aliphatic carbon may also be employed, per se, as a basis for various new silicon-containing rubbers, resins, oils, especially lubricating oils, etc., wherein, for instance, organopolysiloxanes normally used in making the above-mentioned materials may be modified by the introduction of nitrogen into the organosilicon composition in the manner described above. The introduction of nitrogen, for instance, by means of amino groups and specifically aminomethyl and phenyl aminomethyl (—$CH_2NHC_6H_5$) groups attached directly to silicon atoms, may be helpful in certain applications where improved electrical properties are desired or where under certain conditions the arc-extinguishing properties of nitrogen compounds can be utilized. Salts of the organo-silicon compositions containing nitrogen may also be prepared, e. g., salts containing the —$NXX_1$—HCl grouping where X and $X_1$ have the meanings given previously, which can be used for various purposes as, e. g., quaternary amine salts which can be used as surface active agents, for instance, emulsifying agents. The compositions herein described may also be used as modifying agents for other organopolysiloxane materials whereby the modifying properties of the nitrogen-containing organosilicon compositions may be used to advantage.

What I claim as new and desire to secure by Letters Patent of the United States is:

1. The process which comprises effecting reaction in a substantially anhydrous and alcohol-free environment between (1) ammonia and (2) chloromethylpentamethyldisiloxane to form a member of the class consisting of aminomethylpentamethyldisiloxane and bis-(pentamethyldisiloxanylmethyl) amine.

2. The process which comprises effecting reaction in a substantially anhydrous and alcohol-free environment between (1) ammonia and (2) chloromethylpentamethyldisiloxane to form aminomethylpentamethyldisiloxane.

3. The process which comprises effecting reaction between (1) ammonia and (2) chloromethylpentamethyldisiloxane to form bis-(pentamethyldisiloxanylmethyl) amine.

4. An organosilicon composition selected from the class consisting of aminomethylpentamethyldisiloxane and bis-(pentamethyldisiloxanylmethyl) amine.

5. Aminomethylpentamethyldisiloxane.

6. Bis-(pentamethyldisiloxanylmethyl) amine.

References Cited in the file of this patent

UNITED STATES PATENTS

| | | |
|---|---|---|
| 2,513,924 | Elliott | July 4, 1950 |
| 2,557,803 | Sommer | June 19, 1951 |
| 2,567,131 | Speier | Sept. 4, 1951 |

OTHER REFERENCES

Noll et al.: "Jour. Am. Chem. Soc.," vol. 73, Received February 19, 1951, by Journal, pages 3867–3871.